United States Patent [19]

Tokumaru et al.

[11] Patent Number: 4,797,290

[45] Date of Patent: Jan. 10, 1989

[54] LYOPHILIZED PROCESS FOR THE PRODUCTION OF A KEFIR YOGHURT

[75] Inventors: Sennosuke Tokumaru, 10-3, Tsujido Taiheidai 1, Fujisawa-shi, Kanagawa-ken; Michinori Kubo, Sakai; Mari Nogami, Suita, all of Japan

[73] Assignee: Sennosuke Tokumaru, Kanagawa, Japan

[21] Appl. No.: 36,935

[22] Filed: Apr. 10, 1987

Related U.S. Application Data

[62] Division of Ser. No. 914,835, Oct. 2, 1986, Pat. No. 4,702,923.

[30] Foreign Application Priority Data

Oct. 8, 1985 [JP] Japan ................................ 60-223987
Feb. 12, 1986 [JP] Japan ................................ 61-26671

[51] Int. Cl.$^4$ .......................... A23C 9/127; A23C 1/08
[52] U.S. Cl. ........................................ 426/43; 426/61; 426/583; 426/524; 426/385; 426/444
[58] Field of Search .................... 426/43, 615, 34, 640, 426/583, 524, 444, 384, 385, 61, 648, 800, 801; 424/95, 195.1

[56] References Cited

U.S. PATENT DOCUMENTS 3,321,319 5/1967 Hackenberg et al. .............. 426/385

FOREIGN PATENT DOCUMENTS 2907538 10/1979 Fed. Rep. of Germany ...... 426/583
0205938 11/1984 Japan .................................. 426/583

*Primary Examiner*—Marianne Cintins
*Attorney, Agent, or Firm*—Armstrong, Nikaido, Marmelstein & Kubovcik

[57] ABSTRACT

This lyophilized kefir yoghurt is produced by inoculating milk with a kefir starter, which is then cultured therein to thereby produce a yoghurt; and lyophilizing the obtained yoghurt.

6 Claims, 1 Drawing Sheet

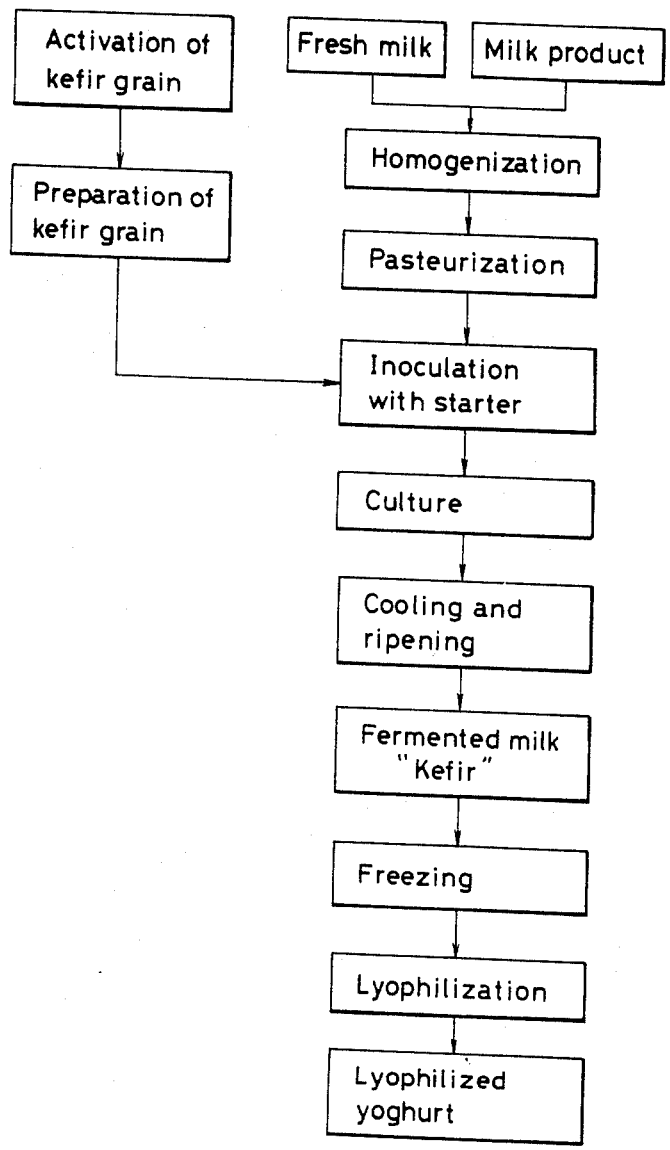

LYOPHILIZED PROCESS FOR THE PRODUCTION OF A KEFIR YOGHURT

This is a division of application Ser. No. 914,835 filed 10/2/86, now U.S. Pat. No. 4,702,923.

BACKGROUND

This invention relates to a lyophilized kefir yoghurt, a process for the production of the same and a health food containing the same as a main ingredient.

It has been known in the art that "kefir", which is a fermented milk originating in Caucasus, has been habitually taken in the Soviet Union and Eastern Europe. Recently the kefir has been rapidly attracting public attention since fermented milk is recognized as an excellent health food and Caucasus is world-famous for longevity.

However, examinations on the kefir, which is different from single-type lactic fermented milk such as yoghurt, are yet insufficient in spite of the recent increase in the attention thereto.

Kefir would form $CO_2$ as ripening is prolonged to thereby elevate the internal pressure of a container, which is an obstacle to the marketing of the same.

On the other hand, there are marketed various health foods riding the crest of the recent health food boom.

However many of these health foods contain vegetable or animal components as active ingredients and there are few solid health foods containing fermented milk as an active ingredient.

SUMMARY

It is a first object of the present invention to provide a powdery lyophilized kefir yoghurt, which will be sometimes called merely a lyophilized yoghurt hereinafter, obtained by lyophilizing kefir.

It is a second object of the present invention to provide a process for the production of the lyophilized kefir yoghurt.

Further it is a third object of the present invention to provide a health food containing the lyophilized kefir yoghurt as a main active ingredient.

The first object of the present invention as described above can be achieved by a powdery lyophilized kefir yoghurt which is prepared by lyophilizing a fermentation product obtained from milk with the use of kefir fungi.

The second object of the present invention can be achieved by inoculating milk with a kefir fungi starter, culturing the kefir fungi therein to thereby produce yoghurt and lyophilizing the obtained yoghurt.

Further the third object of the present invention can be achieved by a health food comprising the lyophilized yoghurt, assistants and excipients.

THE DRAWINGS

The sole appended FIGURE is a flow diagram of a process for the production of the lyophilized yoghurt of the present invention.

THE PREFERRED EMBODIMENTS

The lyophilized kefir yoghurt of the present invention is a fermentation product obtained from milk with the use of kefir fungi and in the form of a lyophilized powder. This lyophilized yoghurt may be produced by inoculating milk with a kefir fungi starter to thereby produce yoghurt which is then lyophilized.

The kefir fungi as described above, which have been obtained from Licensing Organization USSR by us and called YK-1, are a natural symbion which comprises various microorganisms and behaves as a single organism from a biological viewpoint. The kefir fungi are generally in the form of a white cauliflower as large as from an adzuki bean to the head of a little finger and supplied as lyophilized or water-immersed kefir grains.

It is generally very difficult to directly examine the organized bacteria of these grains since the organized bacteria therein are in the dormant state and from a rigid structure together with polysaccharides and proteins.

Thus the organized bacteria of the grains are assumed by culturing the grains in an appropriate medium such as milk at 20° to 25° C. to thereby activate the same and examining the microbes liberated in the medium. The following Table 1 shows the organized bacteria.

TABLE 1

| Yeast | |
|---|---|
| Candida pseudotropicalis | $10^5$–$10^6$/ml |
| Candida Krusei | $<10^5$/ml |
| Torulopsis holmii | $<10^5$/ml |
| Lactic acid bacteria | |
| Streptococcus lactis | $10^8$–$10^9$/ml |
| Lactobacillus brevis | |
| Lactobacillus fermentum | |

Several species, which are highly symbiotical and can be hardly separated, are further observed.

Acetic acid bacteria

Highly symbiotical and hardly separated.

As shown above, *S. lactis* is the most predominant bacterium and the lactic acid in the midium is mostly produced thereby. Among the yeasts, only *C. pseudotropicalis* ferments lactose to thereby form ethanol and $CO_2$.

Now a process for the production of a lyophilized yoghurt will be described by reference to the appended figure.

In the present invention, the kefir grains as described above are first activated. Since the organized bacteria in the kefir grains are in the dormant state, it is required to activate the same to thereby make them sufficiently active in a medium to make a definite number of colonies with in a given period of time.

The activation may be usually achieved by subculturing the kefir grains several times, i.e., by culturing the kefir grains in milk at 20° to 25° C., separating the grains and culturing the same again.

An example of the activation process is as follows:
medium: UHT pasteurized milk (pasteurized at 130° C. for two seconds); and
culture condition: 21° C. and 24 hours.

The kefir grains are subjected to a pretreatmnnt and added to a medium depending on the storage condition.

Lyophilized kefir grains are immersed in sterilized water or sterilized physiological saline solution for approximately six hours and washed. Then they are added to a medium in an amount of approximately 7.5% by weight based o the medium.

Water-immersed kefir grains are washed with a physiological saline solution and added to a medium in an amount of approximately 7.5% by weight based on the medium.

Both kefir grains are treated in the same manner after the second subculture. Namely, approximately 7.5% by weight of the kefir grains are added to a medium. The kefir grains capable of coagulating milk in about 20 hours are judged to be activated.

The activation of lyophilized kefir grains and water-immersed ones requires 10 days or longer and four to five days, respectively.

Then a kefir starter is prepared from the kefir grains thus activated.

Namely, one part by weight of the activated kefir grains are added to 30 to 50 parts by weight of fresh milk, i.e., 20 to 30 g of the grains per liter of the milk, and cultured therein. The culture may be usually performed at 15° to 25° C., preferably at 15° to 20° C. in summer and 18° to 22° C. in winter. After culturing the grains in the milk for 15 to 16 hours, the culturing broth is stirred for three or four minutes. The culture is performed for additional five to seven hours followed by stirring again. Then the culturing broth is filtered into a clean container.

The obtained filtrate, which has a pH value of 4.0 to 4.6, is the aimed kefir starter. The grains on the filter is introduced into fresh pasteurized cold milk again. The solution obtained by filtering the grains off, i.e., the kefir starter is used in the production of Thus the whole process for the preparation of the starter usually required 24 hours.

Table 2 shows the organized bacteria of the kefir starter.

TABLE 2

| Homofermentation mesophilic lactic acid streptococci (a) |
| Homofermentation thermophilic lactic acid bacilli |
| Perfume forming bacteria |
| Yeasts (b) |
| Acetic acid bacterium (c) |

The streptococci (a) include perfume forming streptococci which rapidly elevate the acidity of the starter, e.g., *Streptococcus lactis, S. cremoris, Louconostoc citrovarum, L. dextranicum* and *S. diacetilactis.*

The yeasts (b) include those fermenting lactose as well as those not fermenting the same. The acetic acid bacterium (c) has fiagellums all over the surface and is capable of utilizing lactic acid as an energic material, different from *Acetobacter aceti.*

Then a fermented milk "kefir" is produced with the use of the starter. Fresh milk optionally containing milk product(s) is employed as the raw material. The milk products to be added to the fresh milk are powdered or condensed milk. Usually two to ten parts by weight of the milk products are added to 100 parts by weight of the fresh milk.

Then the fresh milk or mixture is heated to 60° to 70° C. under thoroughly stirring and subjected to further homogenization.

This homogenization is carried out in order to prevent the separation of fat during the fermentation or before the drying, as will be described hereinbelow. It is generally performed by applying a pressure of 100 to 150 kg/cm2 and passing the fresh milk or mixture through, for example, a screen. After applying the pressure, the frest milk or mixture is pasteurized by heating the same to 85° to 95° C. for five to 30 minutes.

After the pasteurization, the fresh milk or mixture is cooled to the same temperature (15° to 25° C.) as that of the starter to be used and inoculated with said starter under stirring.

100 parts by weight of the pasteurized material is inoculated with three to five parts by weight of the starter.

After inoculating with the starter, the material is cultured at the same temperature as that of the starter used under occasional stirring.

During this culture step, two processes, i.e., lactic fermentation and alcohol fermentation, proceed in parallel with each other different from single-type lactic fermentation as typically observed in the production of yoghurt The culture usually completes within 12 to 24 hours.

After the completion of the culture, the mixture is cooled to 10° to 15° C. and allowed to ripen at this temperature for five to 20 hours.

After the completion of the ripening, it is cooled to 2° to 5° C. to thereby cease the fermentation.

Table 3 shows the properties of the fermented milk "kefir" thus obtained.

Table 4 shows the result of the counting of the lactic acid bacteria per gram of the kefir. Table 4 indicates that a sample obtained by culturing the material in an MRS agar medium at 25° C. for seven days shows the largest count, i.e., $1.6 \times 10^7$/g.

TABLE 3

| Composition | |
|---|---|
| milk | 92.4% |
| milk products | 2.9% |
| kefir starter | 4.7% |
| Nutritional components (per 100 g): | |
| energy | 68 Kcal |
| water | 86.1 g |
| protein | 3.9 g |
| lipid | 3.2 g |
| sugar | 5.9 g |
| fiber | 0.0 g |
| ash | 0.9 g |
| calcium | 129 mg |
| phosphorus | 116 mg |
| iron | 0.1 mg |
| sodium | 65 mg |
| potassium | 199 mg |
| retinol | 29 ug |
| carotene | 11 ug |
| A activity | 111 IU |
| vitamin B1 | 0.05 mg |
| vitamin B2 | 0.19 mg |
| niacin | 0.1 mg |
| vitamin C | 0 mg |

TABLE 4

| Medium | Culture condition | Lactic acid bacteria count (/g) |
|---|---|---|
| BL agar | aerobic, 37° C., 72 hr | <1,000 |
| | anaerobic, 37° C., 72 hr | <1,000 |
| | aerobic, 30° C., 48 hr | <1,000 |
| | aerobic, 25° C., 7 days | <1,000 |
| MRS agar | aerobic, 37° C., 72 hr | <1,000 |
| | anaerobic, 37° C., 72 hr | <1,000 |
| | aerobic, 30° C., 48 hr | <1,000 |
| | aerobic, 25° C., 7 days | $1.6 \times 10^7$ |
| BCP containing plate count agar | aerobic, 37° C., 72 hr | <1,000 |
| tomato juice agar | aerobic, 37° C., 72 hr | <1,000 |
| | anaerobic, 37° C., 72 hr | <1,000 |
| skim milk agar | aerobic, 30° C., 48 hr | <1,000 |
| Elliker agar | aerobic, 25° C., 7 days | $1.6 \times 10^6$ |
| glucose/yeast extract agar | aerobic, 25° C., 7 days | $6.0 \times 10^6$ |
| SI agar | aerobic, 25° C., 20 days | $2.2 \times 10^6$ |

Bacteria are taken from one or two colonies on each of the MRS agar (separated bacteria a and b), Elliker agar (separated bacterium c), glucose/yeast extract agar (separate bacterium d) and SI agar (separated bacterium e) media. Then the characteristics of the separated bacteria are examined. As a result, it is turned out that every separated bacterium is a hetero-type lactic acid bacillus.

The separated bacteria a, b, d and e are identified with *Lactobacillus brevis*. However the a, b and d show arabinose or maltose fermentabilities somewhat different from those typically observed. The properties of the separated bacterium c suggest that it might relate to *Lactobacillus brevis*, though it is negative in ribose fermentation. Table 5 shows the result of the characteristic test on these bacteria.

TABLE 5

| Separated bacterium Test item | Result a | b | c | d | e |
|---|---|---|---|---|---|
| morphology | bacillus | bacillus | bacillus | bacillus | bacillus |
| gram-stain | positive | positive | positive | positive | positive |
| catalase | − | − | − | − | − |
| formed lactic acid | DL | DL | DL | DL | DL |
| growth at 15° C. | + | + | + | + | + |
| growth at 45° C. | − | − | − | − | − |
| gas production from glucose | + | + | + | + | + |
| gas production from gluconate | + | + | + | + | + |
| sugar fermentability | | | | | |
| amygdaline | − | − | − | − | − |
| arabinose | − | − | − | − | + |
| cellobiose | − | − | − | − | − |
| fructose | + | + | + | + | + |
| glucose | + | + | + | + | + |
| gluconate | + | + | + | + | + |
| lactose | + | + | + | + | + |
| maltose | + | + | + | − | + |

TABLE 5-continued

| Separated bacterium Test item | Result a | b | c | d | e |
|---|---|---|---|---|---|
| mannitol | − | − | − | + | + |
| mannose | − | − | − | − | − |
| melezitose | − | − | − | − | − |
| melibiose | + | + | + | + | + |
| raffinose | − | − | − | − | − |
| rhamnose | − | − | − | − | − |
| ribose | + | slight | − | + | + |
| sorbitol | − | − | − | − | − |
| sucrose | − | − | − | − | − |
| trehalose | − | − | − | − | − |
| xylose | − | − | − | − | − | sucrose

The fermented milk kefir thus obtained is introduced into a container such as a tray and cooled to −25° to −35° C. to thereby freeze the same.

Thus a milk white frozen product is obtained.

The obtained frozen product is maintained at a temperature of 35° to 40° C. or below and dried under a reduced pressure of 0.1 to 1.0 mm Hg.

The lyophilized yoghurt thus obtained is in the form of a white or milk white powder having a milk-like odor.

Table 6 shows the composition of the lyophilized yoghurt thus obtained.

The obtained lyophilized yoghurt of the presen invention is in the form of a white powder which can be readily handled and stably stored at room temperature for a prolonged period of time.

Further it may be readily formulated into granules. In addition, the milk-like odor thereof makes the intake thereof easy.

Accordingly the lyophilized yoghurt of the present invention per se can be marketed as a health food by appropriately dividing and packaging.

The lyophilized yoghurt of the present invention shows no increase in the inner pressure within a container caused by the formation of $CO_2$, which is observed in conventional unlyophilized kefir.

It is further noteworthy that the lyophilized yoghurt of the present invention has the following excellent physiological effects.

TABLE 6

| Analysis item | Result | Lower limit of detection | Note | Analytical method |
|---|---|---|---|---|
| water | 1.7% | | | heat-drying in vacuo |
| protein | 26.3% | | 1 | Kjeldahl method |
| lipid | 27.4% | | | Rose-Gottlieb method |
| fiber | 0% | | | modified Henneberg-Stohmann method |
| ash | 6.0% | | | direct ashing |
| sugar | 38.6% | | 2 | |
| arsenic (as $As_2O_3$) | undetected | 0.1 ppm | | DDTC-Ag absorptiometry |
| heavy metal (as Pb) | undetected | 1 ppm | | sodium sulfide colorimetric method |
| coliform bacilli | negative | | 3 | BGLB method |
| general viable bacterial count except lactic acid bacteria | <300/g | | 4 | |
| yeast count | $3.7 \times 10^2$/g | | | potato dextrose (10%) agar plate culture |
| lactic acid bacteria count | $2.8 \times 10^9$/g | | 5 | BCP-containing agar plate culture |
| lactic acid | $8.2 \times 10^9$/g | | 6 | BL agar plate |

TABLE 6-continued

| Analysis item | Result | Lower limit of detection | Note | Analytical method |
|---|---|---|---|---|
| bacteria count | | | | anaerobic culture |

Notes:
1: nitrogen/protein coefficient = 6.38.
2: 100 − (water + protein + lipid + fiber + ash).
3: According to the Coliform Bacilli Test, Food Sanitation Guidance, Ministry of Health and Welfare.
4: According to the Bacterial Counting in Powdery Refreshing Beverage Containing Lactic Acid Bacteria, Provision Food-D: Standard for Food and Food additive (Notification No. 307 of the Ministry of Health and Welfare, 1959).
5: According to Test Method for Composition of Milk, Accompanying Table 2-(7) of Ministeral Ordinance on the Specification for Milk and Milk Product (Notification No. 17 of the Ministry of Health and Welfare, 1979).
6: Cultured at 25° C. for seven days.

A. Antithrombotic effect

Test method:

Kefir is orally administered to Wistar rats in doses of 500 mg/kg and 200 mg/kg. One hour after the administration, 0.5 mg/kg of endotoxin, which induces thrombi, is intravenously injected to each animal. The animal is bleeded four hours thereafter and the blood platelet number, the amount of fibrinogen, the prothrombin time and the amount of fibrin decomposition products (FDP amount) are determined.

Result

As shown in Table 7, thrombus is formed by intravenously injecting endotoxin to the normal group accompanied by decreases in the blood platelet number and in the amount of fibrinogen as well a increases in the prothrombin time and in the FDP amount. In contrast thereto, changes in these test values are significantly inhibited in the test groups to which the lyophilized yoghurt of the present invention is administered. Namely, obvious antithrombotic effects are observed in the 200 mg/kg and 500 mg/kg groups.

B. Effect of immunoinvigoration in the first stage

As soon as an organism is invaded by an alien substance, it shows an immunoinvigoration mechanism to thereby remove the invader. Macrophages and cells in the reticuloendothelial system play main parts in the above mechanism. In this test, carbon is employed as the alien substance and introduced into blood. Then the capability of removing the alien substance is monitored with the guidance of the clearance rate of the same. This process, which is called a carbon clearance method and has been developed by Freedman et al., has been frequently employed in examining a protective reaction in vivo.

Test method:

Male ddy mice of 20 to 25 g in body weight are made to fast in a fasting cage for 18 hours. During this fasting period, the animals are allowed to freely take water. Then a carbon suspension is injected into the tail vein of each animal. The animal is bleeded with the use of a heparin hematocrit capillary and the content of the carbon in the blood is colorimetrically determined from the absorbance at 675 nm. Then the half-life period of the carbon is calculated according to the following equation.

TABLE 7

| Treatment | Dose (mg/kg) | No. of rats | Blood platelet number ($10^4$/mm$^3$) | Fibrinogen (mg/dl) | Prothrombin time (sec) | FDP (μg/dl) |
|---|---|---|---|---|---|---|
| normal | | 6 | 85 ± 10 | 151 ± 34 | 14.4 ± 2.6 | 5.0 ± 0.0 |
| control | | 9 | 27 ± 3 | 44 ± 5 | 23.9 ± 2.0 | 19.0 ± 3.1 |
| lyophilized yoghurt of invention | 200 | 9 | 35 ± 3* | 62 ± 10* | 17.0 ± 1.6 | 15.0 ± 3.8 |
| " | 500 | 9 | 56 ± 8** | 85 ± 17** | 15.0 ± 1.6* | 14.0 ± 4.6 |

$t\frac{1}{2} = (t_2 - t_1) \times \frac{1}{2} ODt_1/(ODt_1 - ODt_2)$.
wherein $t\frac{1}{2}$: half-life period (minutes);
$t_1$: 5 (minutes);
$t_2$: 10 or 15 (minutes);
$ODt_1$: absorbance after 5 minutes; and
$ODt_2$: absorbance after 10 or 15 minutes.

The sample is suspended in water to give doses of 500 mg/kg, 100 mg/kg and 20 mg/kg. As a positive control, 50 mg/kg of zymosan is intraperitoneally administered for three days or orally administered 30 minutes before the intravenous administration of the carbon.

Table 8 shows the result.

TABLE 8

| Sample | Dose (mg/kg) | No. of mice | Clearance rate of carbon |
|---|---|---|---|
| (A) Administered once | | | |
| control | — (oral) | 10 | 11.83 ± 0.37 |
| lyophilized yoghurt of invention | 500 (oral) | 10 | 11.32 ± 0.29 |
| lyophilized yoghurt of invention | 100 (oral) | 10 | 11.73 ± 0.42 |
| lyophilized yoghurt of invention | 20 (oral) | 10 | 10.99 ± 0.42 |
| zymosan | 50 (i.p.) | 10 | 10.72 ± 0.29 |
| (B) Administered for three days (once a day) | | | |
| control | — (oral) | 10 | 12.84 ± 0.57 |
| lyophilized yoghurt of invention | 500 (oral) | 10 | 10.70 ± 0.56 |
| lyophilized yoghurt of invention | 100 (oral) | 10 | 11.41 ± 0.52 |
| lyophilized yoghurt of invention | 20 (oral) | 10 | 12.28 ± 0.63 |
| zymosan | 50 (i.p.) | 10 | 8.31 ± 0.34 |

*Significantly different from the control (P < 0.05).

Table 8 obviously suggests that the lyophilized yoghurt of the present invention shows a slight effect only in a dose of 20 mg/kg when administered once. In contrast thereto, it shows significantly high effects when administered in doses of 500 mg/kg and 100 mg/kg for three days.

Now the health food of the present invention will be described in detail.

This health food comprises the lyophilized yoghurt as described above as well as assistants and excipients.

The assistants are added in order to impart to the product various physiological effects in addition to those brought about by the main ingredient, i.e., the lyophilized yoghurt to thereby enlarge the availability of the product as a health food. Animal or vegetable substances conventionally marketed as health foods or folk medicines are available therefor.

Preferable examples of these assistants include an extract of *Acanthopanax senticosus* Harms. (*Eleut herococus senticosus* Maxim.), that of *Cichorium Intylous* L. and antlers of a reindeer, though they are not restricted thereby.

One of these assistants or a mixture thereof may be added.

The extract of *A. senticosus* Harms. may be replaced by that of ginseng or calcium L(+)-lactate.

The extract of *A. senticosus* Harms., which has been used to accelerate blood circulation for a long time, may be obtained in the following manner.

Roots and stems of *A. senticosus* Harms., which belongs to Araliaceae and mainly occurs in Siberia and North East China, are cut into pieces. 500 l of water is added to, for example, 100 kg of the finely divided product which is thus extracted for three hours at 90° to 100° C. After filtering, approximately 400 g of an extract is obtained.

To the extraction residue, 300 l of water is added again followed by extracting the same at 90° to 100° C. for one hour After filtering, approximately 300 l of an extract is obtained.

These extracts are combined and concentrated to approximately 20 l at 60° C. or below in vacuo. The obtained concentrate is spray-dried and the dry product is passed through a screen to thereby give approximately 5 kg of a homogeneous powder.

A powder of reindeer antlers, which has been considered as a tonic, may be prepared by finely dividing reindeer antlers imported from Finland, further hammermilling the same and filtering the same through a 100-mesh screen to give a homogeneous powder. A sterilization step may be optionally performed during the preparation.

The ginseng dried extract to be used in stead of the *A. senticosus* Harms. extract may be prepared by subjecting root of *Panax Ginseng* C. A. Meyer in a two-time repetition, concentrating the liquid extract under reduced pressure, and spray drying the concentrate. It may be added in the same amount as that of the *A. senticosus* Harms. as will be defined hereinbelow. Calcium L(+)-lactate may be prepared through a neutralizing reaction between fermented L(+) lactic acid and lime. It is added in an amount of 0.5 to 1% by weight of the total health food.

Further the *C. Intylous* L. extract, which has been used in immunoinvigoration in Europe for a long time, may be prepared in the following manner.

Namely, leaves and roots of *Cichorium Intylous* L., which belongs to *Conpositae* and mainly occurs in Europe, are cut into pieces. 800 l of water is added to, for example, 100 kg of the finely divided product which is thus extracted at 90 to 100° C. for three hours. After filtering, approximately 700 l of an extract is obtained.

500 l of water is added to the extraction residue which is thus further extracted at 90 to 100° C. for one hour. After filtering, approximately 400 l of an extract is obtained.

These extracts are combined and concentrated to approximately 35 kg at 60° C. or below in vacuo to thereby give a soft syrup.

The excipients as used in the present invention include lactose and starch. One of these excipients or a mixture thereof may be employed.

In the health food of the present invention, the kefir, assistants and excipients are blended in the proportions as shown in the following Table 9.

TABLE 9

| Lyophilized kefir | usually 30 to 50% by weight, preferably 35 to 45% by weight |
|---|---|
| Assistant | usually 7 to 15% by weight, preferably 9 to 14% by weight |
| Excipient | usually 40 to 55% by weight, preferably 45 to 55% by weight |

Table 10 shows the composition of an example of the health food of the present invention which comprises an *A. senticosus* Harms. extract, a reindeer antler powder and a *C. Intylous* L. extract as the assistants and lactose and starch as the excipients.

TABLE 10

| Lyophilized kefir | usually 30 to 50% by weight, preferably 35 to 45% by weight |
|---|---|
| *A. senticosus* Harms. extract | usually 1.5 to 4.0% by weight, preferably 2.0 to 3.5% by weight |
| Reindeer antler powder | usually 0.3 to 1.0% by weight, preferably 0.4 to 0.8% by weight |
| *C. Intylous* L. extract | usually 5.5 to 10% by weight, preferably 6.5 to 9.5% by weight |
| Lactose | usually 30 to 38% by weight, preferably 32 to 37% by weight |
| Starch | usually 10 to 18% by weight, preferably 12 to 17% by weight |

When the lyophilized kefir is contained in the health food of the present invention in an amount less than 30% by weight, its inherent physiological effects such as antitumor, antithrombotic and immunoinvigoration effects are lowered. On the other hand, when it is contained in an amount exceeding 50% by weight, no increase in these physiological effects is observed.

When the *A. senticosus* Harms. extract is contained in an amount less than 1.5% by weight, it shows no effect of accelerating blood circulation. On the other hand, when it is contained in an amount exceeding 4.0% by weight, no increase in said effect is observed.

When the reindeer antler powder is contained in an amount less than 0.3% by weight, it shows no tonic effect. On the other hand, when it is contained in an amount exceeding 1.0% by weight, no significant increase in said effect is observed.

Further when the *C. Intylous* L. extract is contained in an amount less than 5.5% by weight, it shows a poor immunoinvigoration effect. On the other hand, when it is contained in an amount exceeding 10% by weight, no increase in said effect is observed.

When the lactose is contained in an amount less than 30% by weight, it shows a poor excipient property for formulating granules or tablets, as will be shown hereinbelow. On the other hand, an amount of the same exceeding 38% by weight is excessive for the lyophilized yoghurt or the assistants.

The starch would accelerate th dissolution of other ingredients taken in the body while at the same time it acts as an assistant and as an excipients. When it is contained in an amount less than 10% by weight, the bulking and excipient effect of the same is insufficient. On the other hand, when it is contained in an amount exceeding 18% by weight, no significant difference in said effects is observed.

The health food of the present invention may further contain sweeteners such as sugar, colorants and preservatives if required.

Now a process for the production of the health food of the present invention in granular form will be described.

The assistants and excipients as described above are weighed and mixed together. Then water and ethanol are added thereto and the obtained mixture is kneaded.

The knedded mixture is passed through a screen of 1 mm in diameter and the particles thus. obtained are dried at 60° to 80° C. for one hour. The dried particles are arranged by passing through a 12-mesh screen and further passed through a 12-mesh screen.

Separately a lyophilized kefir is prepared in the abovementioned manner and formulated into granules by, for example, the same procedure as the one used in the granulation of the assistants and excipients.

Finally the lyophilized kefir and other ingredients, each formulated in granules as described above, are weighed and mixed together to thereby give the health food of the present invention.

Further the presence of coliform bacilli and general viable bacteria therein is optionally examined.

In addition, the obtained health food may be weighed out in a given amount and singly packaged with, for example, a plastics film, if required. Thus a product suitable for marketing and intake may be obtained.

Thus a process for the production of the health food of the present invention in granular form has been described. However it is to be understood that the present invention is not restricted thereby. Therefore it may be formulated into tablets or provided as a powder by omitting the granulation step.

The health food of the present invention may be generally taken in a dose of 2.5 to 3.0 g a day. The singly packaged granules as mentioned above is preferable since it would not scatter at the intake.

Alternately the granules may be packed in a bottle and taken in a given amount with the use of, for example, a measuring spoon.

The health food of the present invention is in a grayish white or grayish brown color depending on the types and amounts of the added assistants and has a milk-like odor and taste. Thus it can be easily taken. Further it shows no change even when stored for a prolonged period of time.

As described above, the health food of the present invention contains the lyophilized kefir. Therefore it fully sustains antithrombotic and immunoinvigoration effects as such which are inherently exerted by the lyophilized yoghurt.

Further, since the lyophilized kefir is obtained by lyophilizing kefir yoghurt, it can be suitably used similar to conventional health foods without the need of taking such side effects into consideration as those accompanying the mitomycin.

Furthermore, the health food of the present invention contains assistants in addition to the lyophilized yoghurt. Therefore it is expected to exhibit, for example, blood circulation accelerating, tonic and immunoinvigoration effects depending on the employed assistants.

In addition, the health food of the present invention may be formulated into, for example, granules by adding excipients. Thus the milk-like odor and tast of the lyophilized kefir are maintained as such, which makes the intake of a given amount of the product easy.

To further illustrate the present invention, the following Examples will be given.

EXAMPLE 1

17 kg of fresh milk was pasteurized at 140° C. for two seconds and cooled to 21° C. Then the milk was inoculated with 0.6 kg of activated kefir grains which were thus cultured therein at 21° C. for 15 hours.

After stirring for three to four minutes, the culture was further performed at 21° C. After stirring again, the culture broth was filtered through a screen and 17 kg of the obtained culture filtrate was used as a kefir starter.

Thus 1.2 kg of the activated kefir grains remained on the screen.

Separately 10 kg of skim milk was mixed with 323 kg of fresh milk and the mixture was heated to 70° C. under thorough stirring. Then it was homogenized under an elevated pressure of 150 kg/cm$^2$. After pasteurizing at 90° C. for ten minutes, it was cooled to 21° C. and inoculated with 17 kg of the above kefir starter under stirring followed by culturing at 21° C. under occasional stirring. Then the culture was cooled to 15° C. and allowed to ripen at this temperature for five hours. After cooling to 5° C., 350 kg of kefir was obtained.

The obtained kefir was divided, placed on a tray and frozen at −25° to −35° C. The frozen product was dried at 35° to 40° C. under a pressure of 0.1 to 1.0 mmHg to thereby give 49 kg of the lyophilized yoghurt of the present invention.

EXAMPLE 2

A health food of the composition as shown in the following Table 13 was produced.

TABLE 11

| | |
|---|---|
| lyophilized kefir | 1000 mg |
| A. senticosus Harms. extract | 81.90 mg |
| reindeer antler powder | 17.55 mg |
| C. Intylous L. extract | 234.00 mg |
| lactose | 833.275 mg |
| starch | 333.275 mg |

Thus these ingredients in amounts as shown in Table 11 were thoroughly mixed together and the obtained mixture was granulated. The granules thus obtained, which were in a pale brown color and showed a milk-like odor and flavor, wer tasty and could be easily taken.

We claim:

1. A process for the production of lyophilized kefir yoghurt obtained from milk with the use of Kefir fungi, said process comprising the steps of:

culturing kefir grain in pasteurized milk at a temperature of 20° to 25° C. for a sufficient time to produce a kefir starter, preparing a cooled pasteurized milk or a pasteurized milk mixture, wherein the milk mixture is obtained by the step of combining fresh milk and at least one milk product; by heating the milk or milk mixture to a temperature of 60 to 70° C. under a pressure of 100 to 150 kg/cm, and then pasteurizing the heated milk or milk mixture at 85° to 95° C. for 5 to 30 minutes, and then cooling the pasteurized milk or pasteurized milk mixture to a temperature of 15° to 25° C. to obtain a cooled pasteurized milk or pasteurized milk mixture, culturing the kefir starter in the cooled pasteurized milk or pasteurized milk mixture at a temperature of 15° to 25° C. for 12 to 24 hours, ripening the cultured kefir starter in the cooled pasteurized milk or pasteurized milk mixture for 5 to 20 hours at a temperature of 10° to 15° C. to produce kefir yoghurt to a temperature of, −25° to −35° C. to produce frozen kefir yoghurt, and lyophilizing the forzen kefir yoghurt under a reduced pressure of 0.1 to 1.0 mmHg at a temperature of 35° to 40° C. to produce a lyophilized kefir yoghurt.

2. A process for the production of lyophilized kefir yoghurt as set forth in claim 1,
wherein said kefir grain comprsies kefir fungi.

3. A process for the production of lyophilized yoghurt as set forth in claim 2, wherein said kefir fungi consist essentially of *Candida pseudotropicalis, Candida krusei, Torulopsis holmii* and *Streptococcus lactis*.

4. A proces for the production of a lyophilized kefir yoghurt as set forth in claim 1, wherein the step of producing a kefir starter, 1 part by weight of activated kefir grain is introduced into 30 to 50 parts by weight of fresh milk 5. A process for the production of a lyophilized kefir yoghurt as set forth in claim 1, wherein in said step of preparing a cooled pasteurized milk mixture 100 parts by weight of said fresh milk is blended with two to ten parts by weight of said milk product.

6. A process for the production of a lyophilized kefir yoghurt as set forth in claim 1, wherein said milk product is powdered or condensed milk.

* * * * *